(12) United States Patent
Toyoda et al.

(10) Patent No.: US 11,279,302 B2
(45) Date of Patent: Mar. 22, 2022

(54) GROMMET AND WIRE HARNESS

(71) Applicants: Yazaki Corporation, Tokyo (JP); TOYOTA JIDOSHA KABUSHIKI KAISHA, Toyota (JP)

(72) Inventors: Ryohei Toyoda, Aichi (JP); Katsuya Yoshimura, Aichi (JP); Tomoyoshi Katayama, Toyota (JP); Ryuuta Izumi, Toyota (JP)

(73) Assignees: YAZAKI CORPORATION, Tokyo (JP); TOYOTA JIDOSHA KABUSHIKI KAISHA, Aichi-ken (JP)

( * ) Notice: Subject to any disclaimer, the term of this patent is extended or adjusted under 35 U.S.C. 154(b) by 34 days.

(21) Appl. No.: 16/869,550

(22) Filed: May 7, 2020

(65) Prior Publication Data
US 2020/0353881 A1 Nov. 12, 2020

(30) Foreign Application Priority Data

May 9, 2019 (JP) .............................. JP2019-088873

(51) Int. Cl.
*B60R 16/02* (2006.01)
*H02G 3/22* (2006.01)
*H02G 3/04* (2006.01)

(52) U.S. Cl.
CPC ....... *B60R 16/0222* (2013.01); *H02G 3/0406* (2013.01); *H02G 3/22* (2013.01)

(58) Field of Classification Search
CPC ..... B60R 16/0222; H02G 3/0406; H02G 3/22
See application file for complete search history.

(56) References Cited

U.S. PATENT DOCUMENTS

| | | | | |
|---|---|---|---|---|
| 3,053,564 A | * | 9/1962 | Evans | B60J 5/04 49/167 |
| 3,633,250 A | * | 1/1972 | Romney | F16B 7/048 403/76 |
| 6,278,060 B1 | * | 8/2001 | Mori | B60R 16/0222 174/650 |
| 6,660,937 B1 | * | 12/2003 | MacLeod | H02G 3/22 174/659 |
| 2001/0008330 A1 | * | 7/2001 | Sakata | B60R 16/0222 277/316 |

(Continued)

FOREIGN PATENT DOCUMENTS

| | | | | |
|---|---|---|---|---|
| JP | H10-252951 A | | 9/1998 | |
| JP | H10252951 A | * | 9/1998 | ................ F16L 5/00 |

(Continued)

*Primary Examiner* — Timothy J Thompson
*Assistant Examiner* — Rhadames Alonzo Miller
(74) *Attorney, Agent, or Firm* — Kenealy Vaidya LLP (57) ABSTRACT

A grommet includes a main body that fits into a through hole penetrating an attachment target in an axial direction to waterproof the through hole and that allows a wiring member to be inserted into an inner portion in the axial direction. The main body includes a plate-shaped portion extending in intersecting directions that intersect the axial direction so as to close at least a portion of the through hole, and a sound insulation wall portion having a sound insulation protrusion that protrudes from the plate-shaped portion in the axial direction so as to be formed in an annular or arc shape centered around a central axis in the axial direction.

7 Claims, 6 Drawing Sheets

(56) References Cited

U.S. PATENT DOCUMENTS

| | | | | |
|---|---|---|---|---|
| 2002/0038492 A1* | 4/2002 | Hashimoto | ............... | F16L 5/10 16/2.1 |
| 2003/0010566 A1* | 1/2003 | Miyakawa | ....... | F02M 35/10334 181/204 |
| 2003/0014924 A1* | 1/2003 | Nakamura | .......... | B60R 13/0846 52/1 |
| 2003/0015339 A1* | 1/2003 | Sato | .................... | B60R 16/0222 174/668 |
| 2004/0140118 A1* | 7/2004 | Nishimoto | .......... | B60R 16/0222 174/650 |
| 2004/0154819 A1* | 8/2004 | Sakata | ................ | B60R 16/0222 174/650 |
| 2005/0140075 A1* | 6/2005 | Mishima | ................. | F16F 15/06 267/140.11 |
| 2008/0017401 A1* | 1/2008 | Uchida | ............... | B60R 16/0222 174/153 G |
| 2008/0220659 A1* | 9/2008 | Ikeya | ................. | H01R 13/5213 439/701 |
| 2009/0000861 A1* | 1/2009 | Hikami | ................. | F01N 13/102 181/200 |
| 2009/0028659 A1* | 1/2009 | Shibuya | ................ | F16B 21/073 411/57.1 |
| 2009/0056230 A1* | 3/2009 | Flendrig | ................ | B60J 5/0463 49/502 |
| 2009/0065235 A1* | 3/2009 | Uchibori | ............. | B60R 16/0222 174/152 G |
| 2010/0176533 A1* | 7/2010 | Hayashi | ............ | B29C 45/14418 264/252 |
| 2010/0314158 A1* | 12/2010 | Suzuki | .................... | H02G 3/22 174/152 G |
| 2011/0073350 A1* | 3/2011 | Okuhara | ................ | H02G 3/083 174/152 G |
| 2011/0247172 A1* | 10/2011 | Yoshii | ................... | F16B 21/073 16/2.1 |
| 2012/0211262 A1* | 8/2012 | Agusa | ...................... | H02G 3/22 174/152 G |
| 2012/0217041 A1* | 8/2012 | Agusa | ...................... | F16J 15/52 174/153 G |
| 2012/0252272 A1* | 10/2012 | Omae | .................. | H01R 13/506 439/607.01 |
| 2013/0008693 A1* | 1/2013 | Okuhara | .................. | F16L 5/10 174/152 G |
| 2013/0199823 A1* | 8/2013 | Kanai | .................. | H02G 3/0468 174/152 G |
| 2014/0060947 A1* | 3/2014 | Braun | .................... | B23P 11/00 180/69.22 |
| 2015/0041210 A1* | 2/2015 | Inao | .................... | B60R 16/0215 174/72 A |
| 2016/0134090 A1* | 5/2016 | Kushima | .............. | H02G 3/0481 174/362 |
| 2017/0179703 A1* | 6/2017 | Kominato | ................ | H02G 3/22 |
| 2017/0219100 A1* | 8/2017 | Kobayashi | .......... | F16J 15/3224 |
| 2017/0234434 A1* | 8/2017 | Shuto | ......................... | F16J 3/04 277/504 |
| 2017/0349123 A1* | 12/2017 | Katoh | ................ | B60R 16/0222 |
| 2018/0145430 A1* | 5/2018 | Yanai | ...................... | H01B 7/02 |
| 2019/0089142 A1* | 3/2019 | Sugino | ................ | H02G 3/0487 |
| 2020/0079304 A1 | 3/2020 | Yoshimura et al. | | |

FOREIGN PATENT DOCUMENTS

| | | |
|---|---|---|
| JP | 2000-358315 A | 12/2000 |
| JP | 2017-10638 A | 1/2017 |
| JP | 2020-43676 A | 3/2020 |

\* cited by examiner

GROMMET AND WIRE HARNESS

CROSS-REFERENCE TO RELATED APPLICATION(S)

The present application claims priority to and incorporates by reference the entire contents of Japanese Patent Application No. 2019-088873 filed in Japan on May 9, 2019.

BACKGROUND OF THE INVENTION

1. Field of the Invention

The present invention relates to a grommet and a wire harness.

2. Description of the Related Art

As a conventional grommet mounted on a vehicle, for example, Japanese Patent Application Laid-open No. 2017-010638 discloses a grommet attached to a through hole that is formed in a vehicle body panel and through which a wire harness is inserted. The grommet includes a small-diameter tube portion, an enlarged-diameter tube portion, a closing surface portion, and an auxiliary tube portion. The small-diameter tube portion forms an insertion hole through which the wire harness is inserted. The enlarged-diameter tube portion is formed to expand outward from the small-diameter tube portion and extend in an axial direction of the small-diameter tube portion and has an outer peripheral portion with an annular groove into which a peripheral edge of the through hole can be fitted. The closing surface portion extends inward in a radial direction from an inner peripheral surface of the enlarged diameter tube portion to close the enlarged diameter tube portion. The auxiliary tube portion extends from the closed surface to one side in the axial direction so as to form an insertion hole through which the wire harness is inserted.

Meanwhile, the grommet described in Japanese Patent Application Laid-open No. 2017-010638 has room for further improvement in ensuring appropriate sound insulation performance without deteriorating attachability, for example.

SUMMARY OF THE INVENTION

The present invention has been made in view of the above circumstances and aims to provide a grommet and a wire harness that can appropriately ensure sound insulation performance.

In order to achieve the above mentioned object, a grommet according to one aspect of the present invention includes a main body that fits into a through hole penetrating an attachment target in an axial direction to waterproof the through hole and that allows a wiring member to be inserted into an inner portion in the axial direction, wherein the main body includes a plate-shaped portion extending in an intersecting direction to intersect the axial direction so as to close at least a portion of the through hole, and a sound insulation wall portion having a sound insulation protrusion that protrudes from the plate-shaped portion in the axial direction so as to be formed in an annular or arc shape centered around a central axis in the axial direction.

According to another aspect of the present invention, in the grommet, it is possible to configure that the sound insulation protrusion includes a first sound insulation protrusion formed on a surface on one side of the plate-shaped portion in the axial direction, and a second sound insulation protrusion formed on a surface on the other side of the plate-shaped portion in the axial direction, and each of the first sound insulation protrusion and the second sound insulation protrusion is located to be shifted from each other with respect to the intersecting direction.

According to still another aspect of the present invention, in the grommet, it is possible to configure that each of the first sound insulation protrusion and the second sound insulation protrusion is provided concentrically in plurality at intervals with respect to the intersecting direction, the sound insulation wall portion has a configuration in which each of the plurality of first sound insulation protrusions is located to face a gap adjacent to the second sound insulation protrusion across the plate-shaped portion with respect to the axial direction, and each of the plurality of second sound insulation protrusions is located to face a gap adjacent to the first sound insulation protrusion across the plate-shaped portion with respect to the axial direction.

According to still another aspect of the present invention, in the grommet, it is possible to further include a tubular portion formed in a tubular shape integrally with the main body and through which the wiring member is inserted in the axial direction, wherein the plate-shaped portion extends outward in the intersecting direction from the tubular portion and is formed in an annular shape centered around the central axis, and the sound insulation wall portion is expandable and deformable outward in the intersecting direction together with the tubular portion.

In order to achieve the above mentioned object, a wire harness according to one aspect of the present invention includes a wiring member having conductivity; and a grommet provided on the wiring member, wherein the grommet includes a main body that fits into a through hole penetrating an attachment target in an axial direction to waterproof the through hole and that allows a wiring member to be inserted into an inner portion in the axial direction, the main body includes a plate-shaped portion extending in an intersecting direction to intersect the axial direction so as to close at least a portion of the through hole, and a sound insulation wall portion having a sound insulation protrusion that protrudes from the plate-shaped portion in the axial direction so as to be formed in an annular or arc shape centered around a central axis in the axial direction.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Embodiments according to the present invention will be described below in detail with reference to the drawings. Note that the present invention is not limited by the present embodiment. Moreover, components in the following embodiment include those easily interchangeable by those skilled in the art or substantially identical.

EMBODIMENTS

Figure 1:
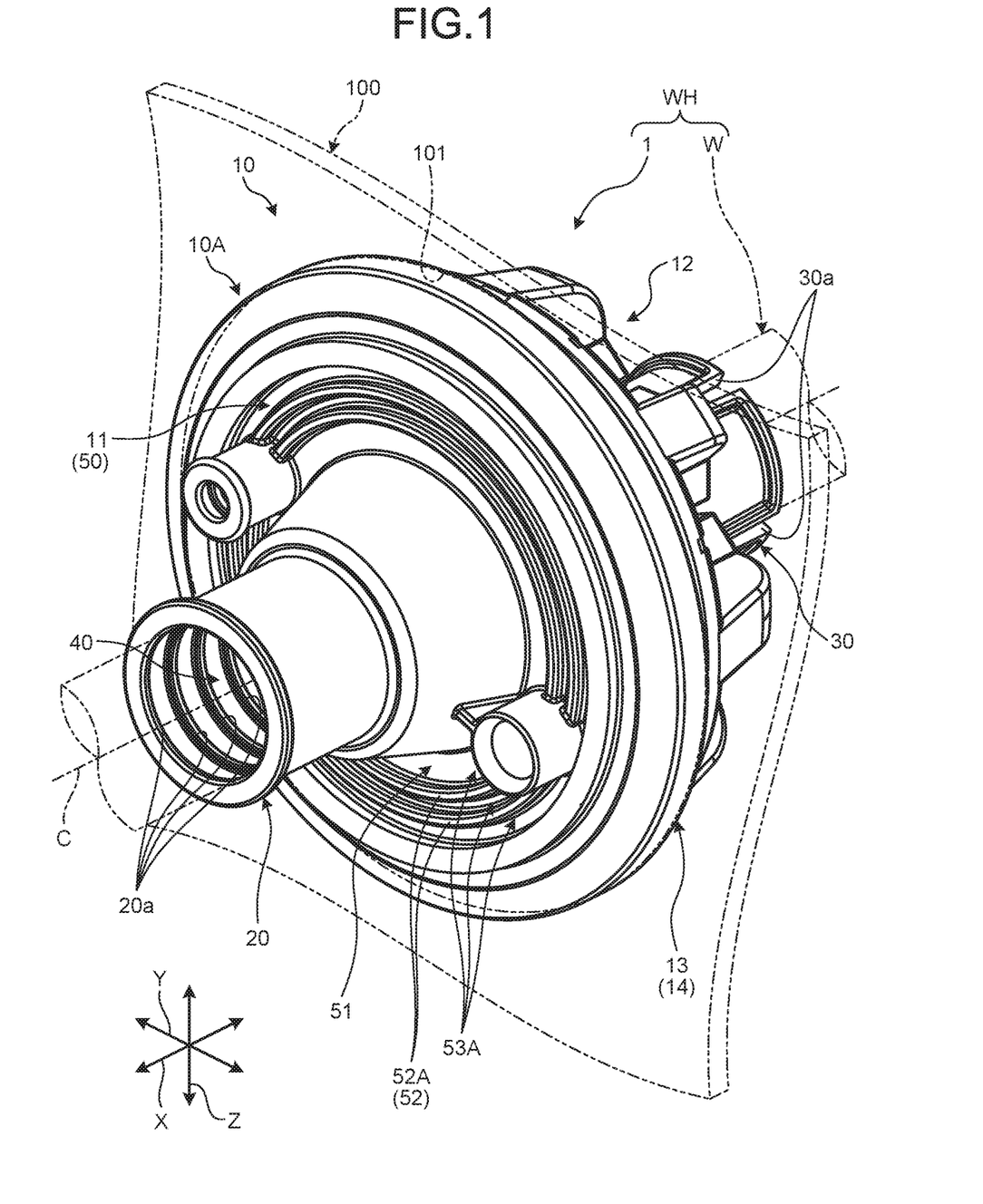
FIG. 1 is a perspective view illustrating a schematic configuration of a wire harness to which a grommet according to an embodiment is applied.
Figure 2:
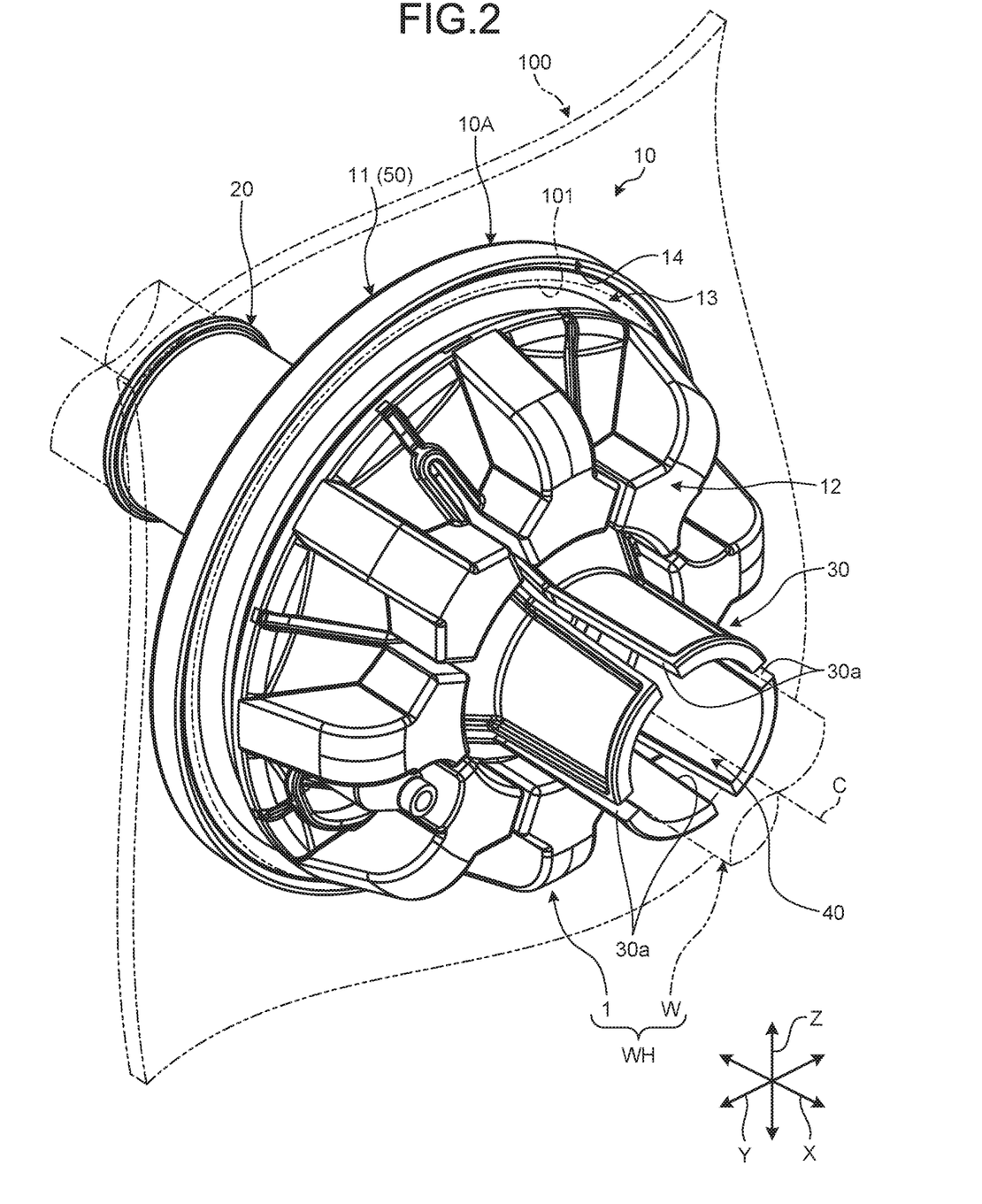
FIG. 2 is a perspective view illustrating a schematic configuration of a wire harness to which a grommet according to an embodiment is applied.
Figure 3:
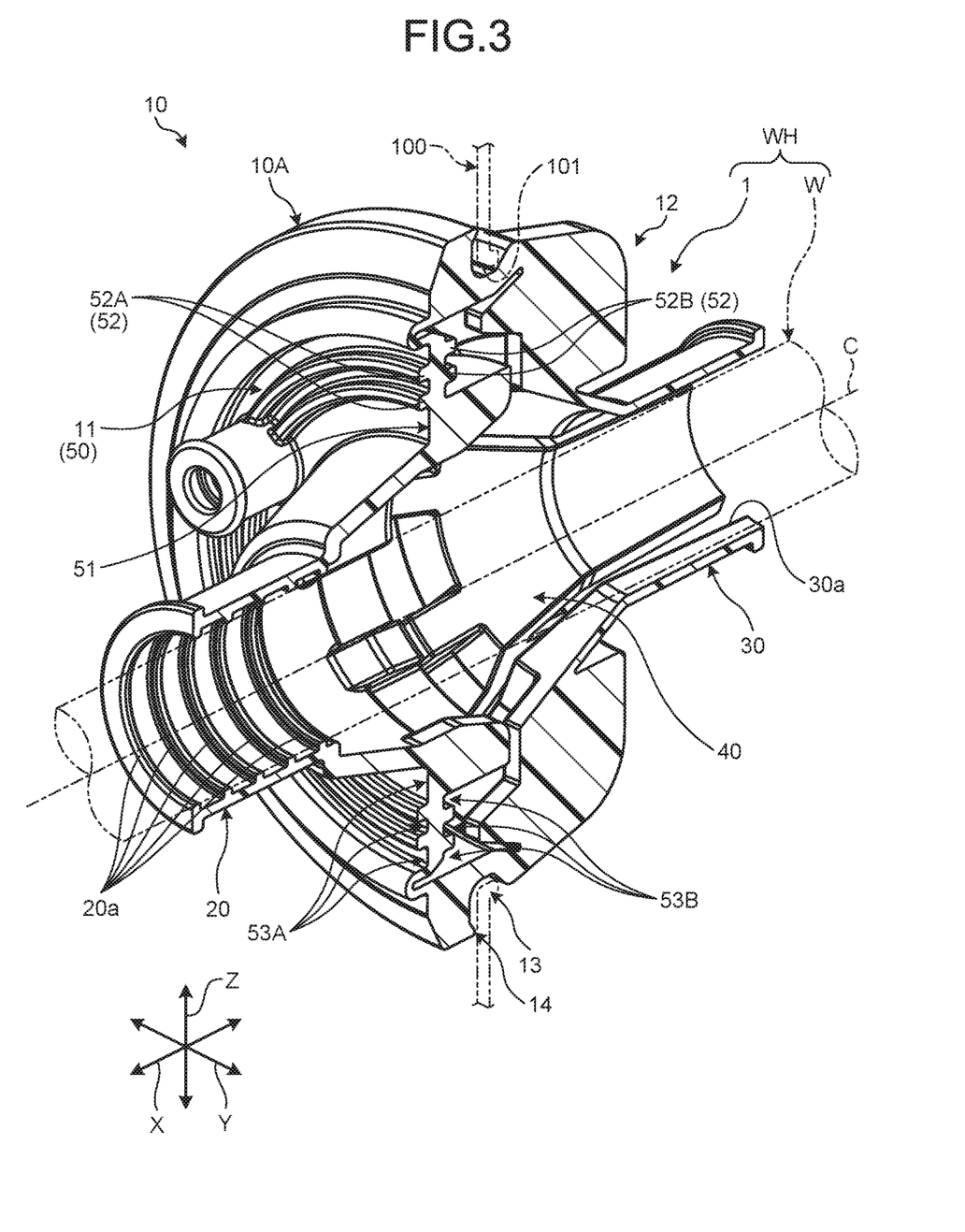
FIG. 3 is a perspective cross-sectional view illustrating a schematic configuration of a wire harness to which a grommet according to an embodiment is applied.

A grommet 1 of the present embodiment illustrated in FIGS. 1, 2, and 3 is to be incorporated in a wire harness WH arranged in a vehicle or the like. Here, the wire harness WH is formed as a component assembly by bundling a plurality of wiring members W used for power supply and signal communication to achieve connection between devices mounted on a vehicle, with the plurality of wiring members W connected to each of the devices via connectors or the like, for example. The wire harness WH includes the wiring member W having conductivity, and the grommet 1 provided on the wiring member W and through which the wiring member W is inserted. The wire harness WH may further include various components such as a corrugated tube, a resin tape, an exterior member such as a protector, an electrical connection box, and a fixture. The wiring member W is formed with a metal rod, an electric wire, an electric wire bundle, or the like, for example. The metal rod is obtained by covering the outside of a conductive rod-shaped member with insulating coating. The electric wire is obtained by covering the outside of a conductor (core wire) formed of a plurality of conductive metal wires with insulating coating. The electric wire bundle is a bundle of the electric wires. The wire harness WH bundles and aggregates a plurality of wiring members W so as to electrically connect various devices via a connector or the like provided at a terminal of the bundled wiring members W.

The grommet 1 is applied to a through hole 101 in arranging the wiring member W across two spaces defined by a mounting panel 100 as a boundary through the through hole 101 formed in the mounting panel 100 being an attachment target. The mounting panel 100 is, for example, a metal plate to form a vehicle body or the like. The through hole 101 penetrates the mounting panel 100 in the thickness direction. The two spaces defined by the mounting panel 100 as a boundary are typically an interior space (for example, a cabin) and an exterior space (for example, an engine compartment). The grommet 1 is attached to the through hole 101 in a state of surrounding the inserted wiring member W of the wire harness WH and thereby protects the wiring member W passing through the through hole 101 and waterproofs the through hole 101. The grommet 1 has functions such as dustproofing and sound insulation in addition to waterproofing of the through hole 101. Hereinafter, a configuration of the grommet 1 will be described in detail with reference to the drawings.

Note that FIGS. 1, 2, and 3 omits illustration of the wiring member W and the mounting panel 100 by using a two-dot chain line, and the other drawings completely omits illustration of the wiring member W and the mounting panel 100. The following description uses a first direction, a second direction, and a third direction intersecting each other, in which the first direction is referred to as an "axial direction X", the second direction is referred to as a "width direction Y", and the third direction is referred to as a "height direction Z". The axial direction X, the width direction Y, and the height direction Z are typically orthogonal to each other. Here, the axial direction X corresponds to the above-described thickness direction of the mounting panel 100 and corresponds to the direction of inserting the wiring member W and the grommet 1 to the through holes 101. In other words, the axial direction X is a direction running in the extending direction of the wiring member W inserted into the grommet 1. The width direction Y and the height direction Z correspond to the extending direction of the mounting panel 100. Here, for the sake of simplicity, the description assumes a configuration in which the wiring member W is arranged linearly in the axial direction X. However, the invention is not limited to this configuration, and the axial direction X may be a bent direction in a state where the grommet 1 is attached to the mounting panel 100, and the grommet 1 and the wiring member W may be installed in a partially bent state. Furthermore, each of directions used in the following description will be given as a direction in a state where the grommet 1 has been assembled to the mounting panel 100, unless otherwise specified.

Specifically, as illustrated in FIGS. 1, 2 and 3, the grommet 1 of the present embodiment is a seal member in which the wiring member W is inserted in the axial direction X and capable of waterproofing between the wiring member W and the through hole 101 of the mounting panel 100. The grommet 1 includes a main body 10, a tubular portion 20, and a tubular portion 30, which are integrally formed as an elastic body. The grommet 1 is formed of an insulating elastic resin material having low rigidity and high flexibility (for example, ethylene-propylene-diene rubber (EPDM)), such as rubber or thermoplastic elastomer, for example.

The main body 10 is a portion that fits into the through hole 101 to waterproof the through hole 101, and into which the wiring member W is inserted in the axial direction X. The main body 10 includes a first partition 11, a second partition 12, a fitting groove portion 13, and a lip portion 14.

Each of the first partition 11 and the second partition 12 is formed in an annular plate shape having a central axis C in the axial direction X. The first partition 11 and the second partition 12 face each other with a space in the axial direction X and are integrated at an outer peripheral portion 10A. Here, the outer peripheral portion 10A is an end located outside in the radial direction (the direction orthogonal to the central axis C) in the first partition 11 and the second partition 12. At least one of the first partition 11 and the second partition 12 (here, the second partition 12) is formed in a shape bulging outward in the axial direction X. The first partition 11 and the second partition 12 are integrally formed at the outer peripheral portion 10A, having a hollow dome shape as a whole. The tubular portion 20 is connected to a surface of the first partition 11 opposite to the second partition 12 side in the axial direction X. The tubular portion 30 is connected to a surface of the second partition 12 opposite to the first partition 11 side in the axial direction X. The first partition 11 and the second partition 12 also includes various ribs, protrusions, holes, or the like.

The fitting groove portion 13 is a groove formed on the outer peripheral portion 10A at which the first partition 11 and the second partition 12 are integrated. The fitting groove portion 13 is formed in the outer peripheral portion 10A as an annular groove portion centered around the central axis C. The fitting groove portion 13 is fitted with an edge forming the through hole 101 in the mounting panel 100 in a state where the main body 10 is fitted into the through hole 101.

The lip portion 14 is a rib-shaped waterproofing portion formed in the fitting groove portion 13. Here, the lip portion 14 is formed in an annular shape in the fitting groove portion 13 at the end of the fitting groove portion 13 on the first partition 11 side. That is, the lip portion 14 is formed in an annular shape centered around the central axis C, in the fitting groove portion 13. The lip portion 14 comes into contact with the surface of the edge of the through hole 101 (here, the surface on the first partition 11 side) in a state where the edge is fitted in the fitting groove portion 13 and waterproofs between the lip portion 14 and the surface. The lip portion 14 adheres to the surface of the edge forming the through hole 101 by elastic deformation so as to seal the entire peripheral edge of the through hole 101.

The tubular portions 20 and 30 are portions formed into a tubular shape integrally with the main body 10 and through which the wiring member W is inserted in the axial direction X.

The tubular portion 20 is formed so as to protrude from the first partition 11 to one side (the opposite side to the second partition 12) in the axial direction X. The tubular portion 20 is formed in a tubular shape centered around the central axis C, and extends in the axial direction X. The tubular portion 20 is formed in a tubular shape having a smaller diameter than the first partition 11. The tubular portion 20 opens in one end in the axial direction X and connected to the first partition 11 in the other end. The tubular portion 20 is connected to a substantially central position of the first partition 11 in the width direction Y and the height direction Z. Here, the tubular portion 20 is formed such that the closer the end of the axial direction X on the first partition 11 side to the first partition 11, the greater the diameter. The tubular portion 20 has a plurality of lip portions 20a formed on an inner peripheral surface. Each of the plurality of lip portions 20a is a rib-shaped waterproofing portion formed in an annular shape in the circumferential direction (direction around the central axis C) and is located at intervals in the axial direction X. Each of the lip portions 20a comes into contact with an outer surface of the wiring member W while the wiring member W is inserted to the inner portion so as to waterproof between the outer surface and the wiring member W. Each of the lip portions 20a adheres to the outer surface of the wiring member W by elastic deformation so as to seal the entire circumference of the wiring member W.

The tubular portion 30 is formed so as to protrude from the second partition 12 to one side (the opposite side to the first partition 11) in the axial direction X. The tubular portion 30 is formed in a tubular shape centered around the central axis C, and extends in the axial direction X. The tubular portion 30 is formed in a tubular shape having a smaller diameter than the second partition 12. The tubular portion 30 opens in one end in the axial direction X and connected to the second partition 12 in the other end. The tubular portion 30 is connected to a substantially central position of the second partition 12 in the width direction Y and the height direction Z. Here, the tubular portion 30 is formed such that the closer the end of the axial direction X on the second partition 12 side to the second partition 12, the greater the diameter. The tubular portion 30 has a plurality of slit portions 30a. Each of the plurality of slit portions 30a is formed linearly in the axial direction X, being spaced at intervals in the circumferential direction (direction around the central axis C).

The grommet 1 formed as described above has a configuration in which the internal space of the main body 10, the tubular portion 20, and the tubular portion 30 functions as an insertion space 40. The insertion space 40, being a space through which the wiring member W is inserted, is continuous in the axial direction X across the tubular portion 20, the main body 10, and the tubular portion 30. In the grommet 1, the wiring member W is inserted in the axial direction X through the insertion space 40 formed continuously across the tubular portion 20, the main body 10, and the tubular portion 30.

The grommet 1 is attached to the wiring member W such that the wiring member W is inserted through the insertion space 40, and thereafter the tubular portion 20 or the tubular portion 30 is inserted into the through hole 101 together with the end of the wiring member W. Subsequently, the edge of the through hole 101 fits into the fitting groove portion 13 of the main body 10 so as to allow the main body 10 to fit into the through hole 101, whereby the grommet 1 is assembled to the mounting panel 100. In this state of the grommet 1, the lip portion 14 is elastically deformed and adheres to the surface of a peripheral edge of the through hole 101 so as to seal the entire peripheral edge of the through hole 101. Note that the grommet 1 can waterproof the openings of the tubular portions 20 and 30 by winding a winding tape or the like over the wiring member W inserted into the insertion space 40 and the tubular portions 20 and 30.

Moreover, the grommet 1 according to the present embodiment has a configuration in which the first partition 11 formed as described above constitutes a sound insulation wall portion 50, and thereby ensures appropriate sound insulation performance without deteriorating attachability, for example.

Figure 4:
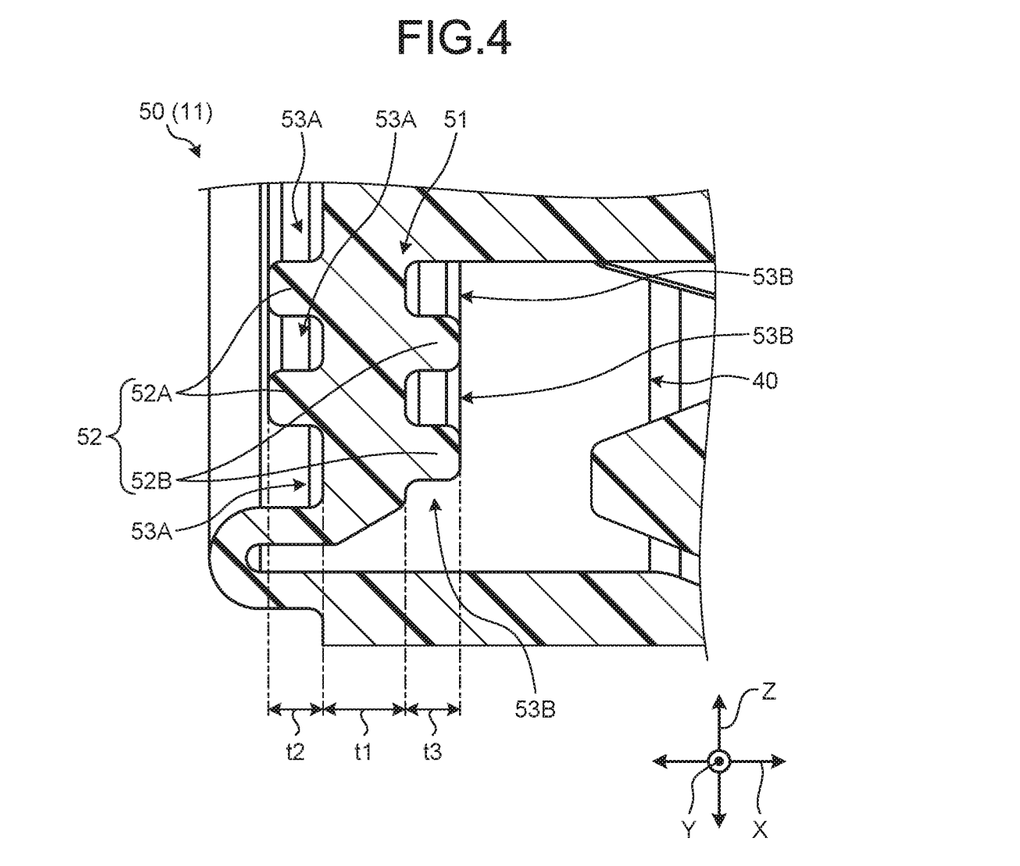
FIG. 4 is a partial cross-sectional view illustrating a sound insulation wall portion of a grommet according to an embodiment.

As described above, the sound insulation wall portion 50 formed by the first partition 11 (hereinafter, simply referred to as the "sound insulation wall portion 50" in some cases) has an annular plate shape with the central axis C extending in the axial direction X as described above. More specifically, as illustrated in FIGS. 1, 3, and 4, the sound insulation wall portion 50 (the first partition 11) includes a plate-shaped portion 51 and a sound insulation protrusion 52.

The plate-shaped portion 51 is a portion with a plate shape extending in the width direction Y and the height direction Z being intersecting directions intersecting with the axial direction X and closing at least a portion of the through hole 101. The plate-shaped portion 51 is formed in an annular plate shape with the central axis C extending in the axial direction X. The plate-shaped portion 51 is formed in a flat plate shape having a constant thickness (plate thickness) t1 (refer to FIG. 4) in the axial direction X. The plate-shaped portion 51 forms a portion of a partition that partitions the insertion space 40 and a space outside the insertion space 40. The outer peripheral portion 10A integrated with the second partition 12 is connected to the outer end of the plate-shaped portion 51 in the radial direction (the direction orthogonal to the central axis C). The end of the tubular portion 20 is connected to the inner end of the plate-shaped portion 51 in the radial direction. In other words, the plate-shaped portion 51 extends from the end of the tubular portion 20 in the axial direction X outward in the width direction Y and the height direction Z, so as to be formed in an annular plate shape centered around the central axis C. The plate-shaped portion 51 closes a portion of the through hole 101 in a state where the main body 10 is fitted into the through hole 101.

The sound insulation protrusion 52 is a portion that protrudes from the plate-shaped portion 51 in the axial direction X and is formed in an annular or arc shape around the central axis C. The sound insulation protrusion 52 of the present embodiment includes: a first sound insulation protrusion 52A formed on a surface on one side in the axial direction X of the plate-shaped portion 51; and a second sound insulation protrusion 52B formed on a surface on the other side in the axial direction X of the plate-shaped portion 51. Here, the first sound insulation protrusion 52A is provided on a surface on the opposite side to the second partition 12 side in the axial direction X of the plate-shaped portion 51 (in other words, a surface on the outer space side of the insertion space 40). In contrast, the second sound insulation protrusion 52B is provided on a surface on the second partition 12 side in the axial direction X of the plate-shaped portion 51 (in other words, a surface on the insertion space 40 side). Additionally, the first sound insulation protrusion 52A and the second sound insulation protrusion 52B are located shifted from each other in the width direction Y and the height direction Z. In other words, the first sound insulation protrusion 52A and the second sound insulation protrusion 52B are formed at positions not mutually overlapping in the axial direction X (positions that do not face each other).

Figure 5:
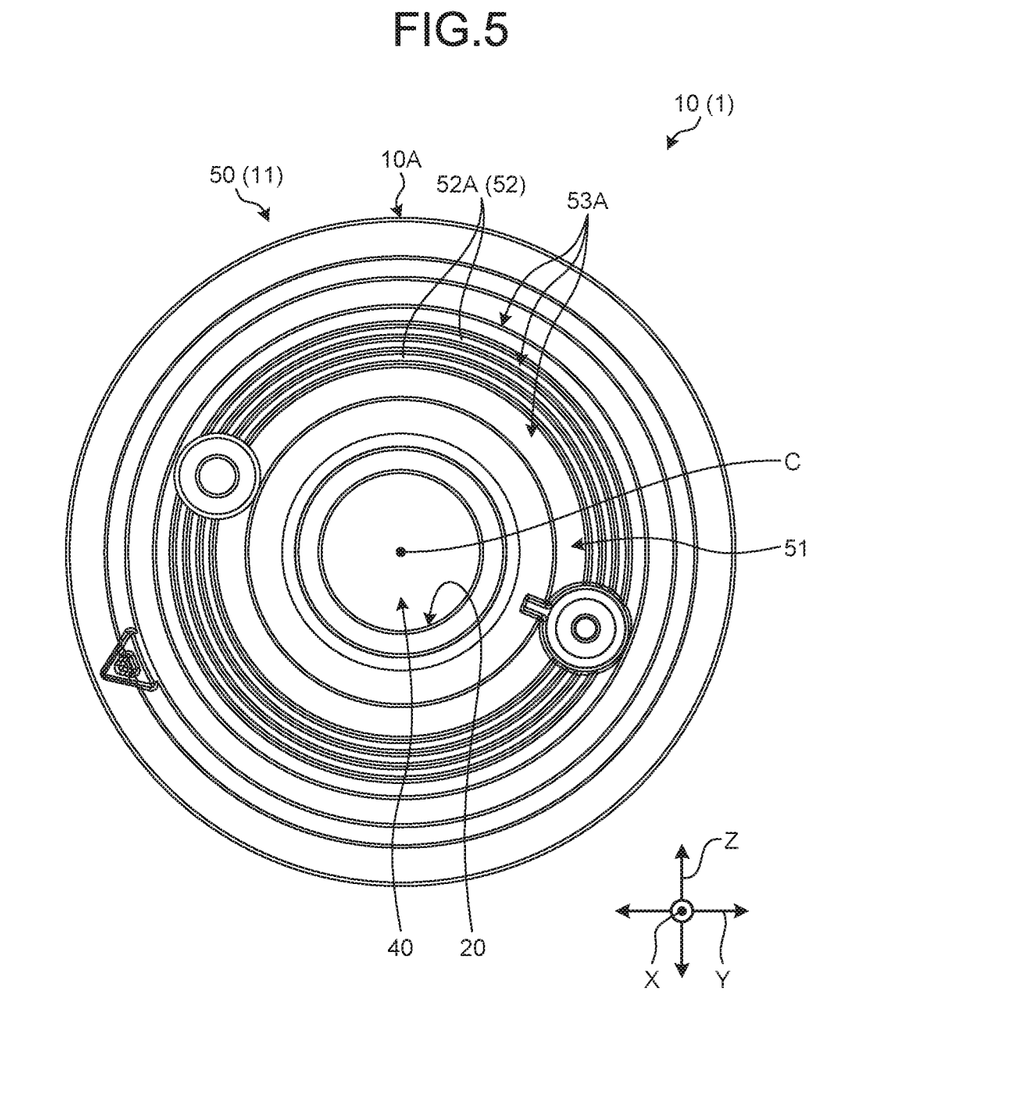
FIG. 5 is a front view of a first sound insulation protrusion in a grommet according to an embodiment.

More specifically, the first sound insulation protrusion 52A is provided concentrically in plurality at intervals in the width direction Y and the height direction Z. In other words, the plurality of first sound insulation protrusions 52A is provided concentrically with a gap 53A interposed in the radial direction. Here, as illustrated in FIG. 5, two first sound insulation protrusions 52A are provided concentrically. Each of the first sound insulation protrusions 52A is formed in a substantially annular shape centered on the central axis C, and then is partially cut away by another protrusion or hole, so as to be divided into a plurality of arc-shaped portions. In other words, each of the first sound insulation protrusions 52A is formed by combining a plurality of substantially arc-shaped protrusions centered on the central axis C so as to be formed as substantially a single annular protrusion as a whole. The first sound insulation protrusions 52A in two concentric circles are formed to have the same center and have different diameters. This allows positioning of one first sound insulation protrusion 52A and the other first sound insulation protrusion 52A having the gap 53A interposed in the radial direction inside the one first sound insulation protrusions 52A. Each of the first sound insulation protrusions 52A has the gap 53A adjacent to each of sides in the radial direction. That is, each of the first sound insulation protrusions 52A is formed so as to be sandwiched between the gaps 53A in the radial direction. Note that various holes formed in the grommet 1 are provided with another wiring member other than the wiring member W or provided with a waterproof treatment, and thus, would not affect waterproof performance of the grommet 1 as a whole.

Figure 6:
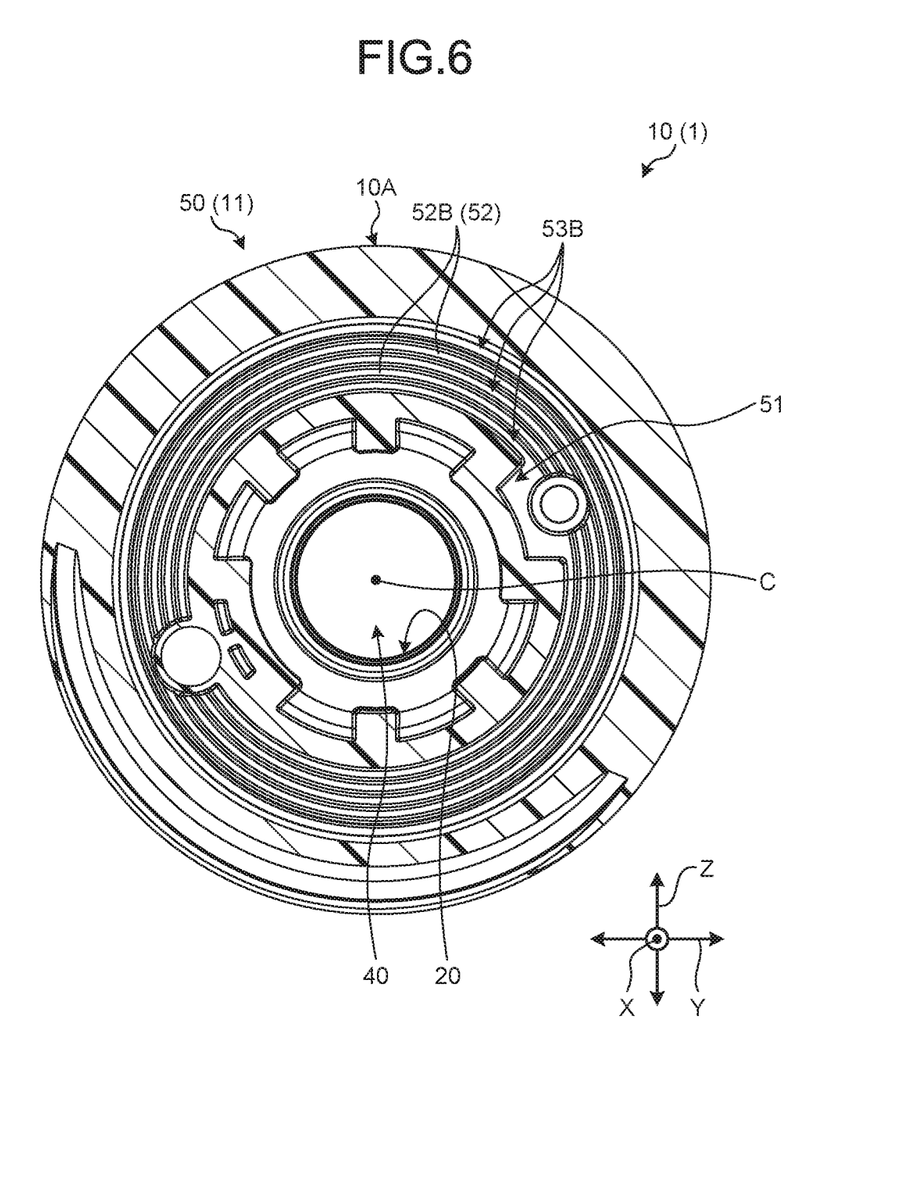
FIG. 6 is a front view of a second sound insulation protrusion in a grommet according to an embodiment.

Similarly, the second sound insulation protrusion 52B is provided concentrically in plurality at intervals in the width direction Y and the height direction Z. In other words, the plurality of second sound insulation protrusions 52B is provided concentrically with a gap 53B interposed in the radial direction. Here, as illustrated in FIG. 6, two second sound insulation protrusions 52B are provided concentrically. Each of the second sound insulation protrusions 52B is formed in a substantially annular shape centered on the central axis C and is partially cut away by another protrusion or hole on the second sound insulation protrusion 52B, so as to be divided into a plurality of arc-shaped portions. In other words, each of the second sound insulation protrusions 52B is formed by combining a plurality of substantially arc-shaped protrusions centered on the central axis C so as to be formed as substantially a single annular protrusion as a whole. The second sound insulation protrusions 52B in two concentric circles are formed to have the same center and have different diameters. This allows positioning of one second sound insulation protrusion 52B and the other second sound insulation protrusion 52B having the gap 53B interposed in the radial direction inside the one second sound insulation protrusions 52B. Each of the second sound insulation protrusions 52B has the gap 53B adjacent to each of sides in the radial direction. That is, each of the second sound insulation protrusions 52B is formed so as to be sandwiched between the gaps 53B in the radial direction.

The sound insulation wall portion 50 has a configuration in which each of the plurality of first sound insulation protrusions 52A faces the gap 53B adjacent to the second sound insulation protrusion 52B across the plate-shaped portion 51 in the axial direction X. Similarly, the sound insulation wall portion 50 has a configuration in which each of the plurality of second sound insulation protrusions 52B faces the gap 53A adjacent to the first sound insulation protrusion 52A across the plate-shaped portion 51 in the axial direction X. That is, the sound insulation wall portions 50 has a configuration in which the first sound insulation protrusions 52A and the second sound insulation protrusions 52B are alternately arranged in plurality without overlapping each other in the radial direction, when viewed in the axial direction X (refer to FIGS. 4, 5, and 6). This configuration allows the sound insulation wall portion 50 to achieve a configuration in which the plurality of first sound insulation protrusions 52A and the plurality of second sound insulation protrusions 52B are each shifted with respect to the width direction Y and the height direction Z, without overlapping each other in the axial direction X.

The first sound insulation protrusion 52A and the second sound insulation protrusion 52B configured as described above both have a cross-sectional shape in the radial direction (refer to FIG. 4) formed into a substantially rectangular shape having curved corners. Furthermore, here, the first sound insulation protrusion 52A and the second sound insulation protrusion 52B are respectively formed to have a thickness t2 in the axial direction X of the first sound insulation protrusion 52A (refer to FIG. 4) and a thickness t3 in the axial direction X of the second sound insulation protrusion 52B, which are substantially equal. Here, each of the thickness t2 and the thickness t3 corresponds to the amount of protrusion of the first sound insulation protrusions 52A and the second sound insulation protrusions 52B respectively, with respect to the plate-shaped portion 51 in the axial direction X.

In the grommet 1 and the wire harness WH described above, the main body 10 is fitted into the through hole 101 formed on the mounting panel 100 to waterproof the through hole 101 and allow the wiring member W to be inserted to the inner portion. In this configuration, the grommet 1 can improve the sound insulation performance by the sound insulation wall portion 50 including the annular or arc-shaped sound insulation protrusions 52 on the plate-shaped portion 51 of the main body 10 that closes a portion of the through hole 101.

For example, in a typical grommet, the thickness in the axial direction X of the wall extending in a direction intersecting the axial direction X tends to contribute to the sound insulation performance. Accordingly, the greater the relative thickness, the higher the sound insulation performance can be achieved. On the other hand, forming such a grommet to have an excessively great wall thickness would make it difficult to deform the main body when the main body is expanded and deformed by an opening and closing device or the like in order to insert the wiring member W to the inner portion, which needs relatively greater force to expand the main body, leading to a trade-off of deterioration in workability.

Fortunately, however, the grommet 1 of the present embodiment achieves a configuration of the sound insulation wall portion 50 in which the thickness t1 in the axial direction X of the plate-shaped portion 51 is not uniformly increased, that is, the thickness of the sound insulation wall portion 50 in the axial direction X can be partially increased by means of the sound insulation protrusion 52, for example. That is, with the constant thickness t1 of the plate-shaped portion 51, the grommet 1 can partially increase the thickness in the axial direction X in the entire sound insulation wall portion 50 by the thicknesses t2 and t3 of the sound insulation protrusions 52 (the first sound insulation protrusions 52A and the second sound insulation protrusions 52B, respectively) in the axial direction X. With this configuration, the grommet 1 can improve the sound insulation performance without deteriorating the deformability when the main body 10 is expanded and deformed by the opening and closing device or the like in order to insert the wiring member W to the inner portion. In other words, the grommet 1 solves the above trade-off and ensures both high sound insulation performance and good workability when expanding and deforming the main body 10 to insert the wiring member W to the inner portion. As a result, the grommet 1 and the wire harness WH can appropriately ensure sound insulation performance.

Here, in the grommet 1 and the wire harness WH described above, the sound insulation wall portion 50 and the tubular portion 20 can expand and deform outward in the radial direction. With such a configuration, the grommet 1 and the wire harness WH can suppress an increase in force required for expanding the sound insulation wall portion 50 together with the tubular portion 20 with the above configuration, making it possible to suppress deterioration of workability when the wiring member W is inserted to the inner portion.

In addition, here, the grommet 1 and the wire harness WH described above have a configuration in which a cross-sectional shape, in the radial direction, of each of the first sound insulation protrusion 52A and the second sound insulation protrusion 52B (end surface shape of the cross section orthogonal to the axial direction X) is formed in a substantially rectangular shape having curved corners. With this configuration, the first sound insulation protrusion 52A and the second sound insulation protrusion 52B can be formed in a shape that can easily ensure a relatively large cross-sectional area. As a result, the grommet 1 and the wire harness WH can efficiently improve the sound insulation performance.

More specifically, the grommet 1 and the wire harness WH described above has the sound insulation protrusion 52 that includes the first sound insulation protrusions 52A and the second sound insulation protrusions 52B formed on both surfaces of the plate-shaped portion 51 in the axial direction X. The first sound insulation protrusions 52A and the second sound insulation protrusions 52B are positioned so as to be shifted from each other in the width direction Y and the height direction Z, individually. With this configuration, the grommet 1 can avoid the presence of a portion where the thickness of the entire sound insulation wall portion 50 in the axial direction X becomes a sum of thicknesses t1, t2, and t3, making it possible to suppress excessive thickness of the entire sound insulation wall portion 50. As a result, the grommet 1 and the wire harness WH can achieve both high sound insulation performance and good workability as described above.

Here, in the grommet 1 and the wire harness WH described above, the plurality of first sound insulation protrusions 52A and the plurality of second sound insulation protrusions 52B are provided concentrically. The plurality of first sound insulation protrusions 52A and the plurality of second sound insulation protrusions 52B are located opposite to the gaps 53A and 53B across the plate-shaped portion 51 in the axial direction X. With this configuration, the grommet 1 can achieve the sound insulation wall portion 50 in which the first sound insulation protrusions 52A and the second sound insulation protrusions 52B are alternately arranged in plurality without overlapping each other in the radial direction. As a result, the grommet 1 can alternately increase the thickness of the entire sound insulation wall portion 50 in the axial direction X, enabling configuration of the sound insulation wall portion 50 having higher deformability and excellent sound insulation performance. Accordingly, the grommet 1 and the wire harness WH can further appropriately ensure sound insulation performance.

Note that the grommet and the wire harness according to the above-described embodiment of the present invention are not limited to the above-described embodiment, and various modifications can be made within the scope described in the claims.

While the above description of the grommet 1 assumes that the first partition 11 forms the sound insulation wall portion 50, the present invention is not limited to this. In the grommet 1, the second partition 12 may form the sound insulation wall portion 50, or both the first partition 11 and the second partition 12 may form the sound insulation wall portion 50. It is sufficient as long as the sound insulation wall portion 50 is provided as a wall portion intersecting the axial direction X.

Although the sound insulation protrusion 52 described above includes the first sound insulation protrusion 52A and the second sound insulation protrusion 52B, the present invention is not limited to this, and the sound insulation protrusion 52 may be formed by one of the two protrusions.

Although each of the first sound insulation protrusion 52A and the second sound insulation protrusion 52B described above is formed in a substantially rectangular shape in which a cross-sectional shape in a radial direction has curved corners, the present invention is not limited to this. Each of the first sound insulation protrusion 52A and the second sound insulation protrusion 52B may have a cross-sectional shape in the radial direction of substantially trapezoidal shape, a substantially triangular shape, a substantially semicircular shape, or the like. Furthermore, the first sound insulation protrusion 52A and the second sound insulation protrusion 52B described above are formed so that the thickness t2 (refer to FIG. 4) and the thickness t3 are substantially equal. However, the present invention is not limited to this, and the thickness t2 and the thickness t3 may be different from each other.

The sound insulation wall portions 50 described above has a configuration in which the first sound insulation protrusions 52A and the second sound insulation protrusions 52B are alternately arranged in plurality without overlapping each other in the radial direction, when viewed in the axial direction X. However, the present invention is not limited to this.

The grommet and the wire harness according to the present embodiment may be configured by appropriately combining the components of the above-described embodiment and modification.

The grommet and the wire harness according to the present embodiment have a configuration in which a main body fits into a through hole formed in an attachment target so as to waterproof the through hole and allow a wiring member to be inserted to an inner portion. With this configuration, the grommet includes a sound insulation wall portion formed with annular or arc-shaped sound insulation protrusions on a plate-shaped portion of the main body that partially closes the through hole and thereby can improve the sound insulation performance. In this case, the grommet can have a partially increased thickness in the axial direction by sound insulation protrusions in the sound insulation wall portion, making it possible to improve the sound insulation performance without deteriorating deformability when the main body is expanded and deformed so as to insert the wiring member to the inner portion. As a result, the grommet and the wire harness can achieve an effect of appropriately ensuring sound insulation performance.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A grommet comprising:
a main body that fits into a through hole penetrating an attachment target in an axial direction to waterproof the through hole and that allows a wiring member to be inserted into an inner portion in the axial direction, wherein
the main body includes
a plate-shaped portion extending in an intersecting direction to intersect the axial direction so as to close at least a portion of the through hole, and
a sound insulation wall portion having a sound insulation protrusion that protrudes from the plate-shaped portion in the axial direction so as to be formed in an annular or arc shape centered around a central axis in the axial direction, and
the sound insulation protrusion is formed in a rectangular shape having curved corners in a cross-sectional shape along a radial direction orthogonal to the central axis.

2. The grommet according to claim 1, wherein
the sound insulation protrusion includes:
a first sound insulation protrusion formed on a surface on one side of the plate-shaped portion in the axial direction, and
a second sound insulation protrusion formed on a surface on the other side of the plate-shaped portion in the axial direction, and
each of the first sound insulation protrusion and the second sound insulation protrusion is located to be shifted from each other with respect to the intersecting direction.

3. The grommet according to claim 2, wherein
each of the first sound insulation protrusion and the second sound insulation protrusion is provided concentrically in plurality at intervals with respect to the intersecting direction,
the sound insulation wall portion has a configuration in which
each of the plurality of first sound insulation protrusions is located to face a gap adjacent to the second sound insulation protrusion across the plate-shaped portion with respect to the axial direction, and
each of the plurality of second sound insulation protrusions is located to face a gap adjacent to the first sound insulation protrusion across the plate-shaped portion with respect to the axial direction.

4. The grommet according to claim 1, further comprising:
a tubular portion formed in a tubular shape integrally with the main body and through which the wiring member is inserted in the axial direction, wherein
the plate-shaped portion extends outward in the intersecting direction from the tubular portion and is formed in an annular shape centered around the central axis, and
the sound insulation wall portion is expandable and deformable outward in the intersecting direction together with the tubular portion.

5. The grommet according to claim 1, further comprising:
a tubular portion formed in a tubular shape integrally with the main body and through which the wiring member is inserted in the axial direction, wherein
the plate-shaped portion extends outward in the intersecting direction from the tubular portion and is formed in an annular shape centered around the central axis, and
the sound insulation wall portion is expandable and deformable outward in the intersecting direction together with the tubular portion.

6. The grommet according to claim 3, further comprising:
a tubular portion formed in a tubular shape integrally with the main body and through which the wiring member is inserted in the axial direction, wherein
the plate-shaped portion extends outward in the intersecting direction from the tubular portion and is formed in an annular shape centered around the central axis, and
the sound insulation wall portion is expandable and deformable outward in the intersecting direction together with the tubular portion.

7. A wire harness comprising:
a wiring member having conductivity; and
a grommet provided on the wiring member, wherein
the grommet includes a main body that fits into a through hole penetrating an attachment target in an axial direction to waterproof the through hole and that allows a wiring member to be inserted into an inner portion in the axial direction,
the main body includes
a plate-shaped portion extending in an intersecting direction to intersect the axial direction so as to close at least a portion of the through hole, and
a sound insulation wall portion having a sound insulation protrusion that protrudes from the plate-shaped portion in the axial direction so as to be formed in an annular or arc shape centered around a central axis in the axial direction, and
the sound insulation protrusion is formed in a rectangular shape having curved corners in a cross-sectional shape along a radial direction orthogonal to the central axis.

* * * * *